United States Patent

[11] 3,571,662

[72] Inventors T. O. Paine
Acting Administrator of the National Aeronautics and Space Administration with respect to an invention of;
Kenneth J. Jenson, Crystal, Minn.
[21] Appl. No. 796,370
[22] Filed Feb. 4, 1969
[45] Patented Mar. 23, 1971

[54] FAILURE SENSING AND PROTECTION CIRCUIT FOR CONVERTER NETWORKS
7 Claims, 1 Drawing Fig.
[52] U.S. Cl. .................................. 317/33, 321/12
[51] Int. Cl. .................................. H02h 7/10
[50] Field of Search ......................... 321/11, 12, 13, 14; 317/33

[56] References Cited
UNITED STATES PATENTS
3,377,540 4/1968 Meyer .................. 321/14X
3,439,252 4/1969 Sikes et al. ............ 321/11

*Primary Examiner*—Robert K. Schaefer
*Assistant Examiner*—William J. Smith
*Attorneys*—R. F. Kempf, E. Levy and G. T. McCoy ABSTRACT: This disclosure describes a failure sensing and protection circuit for use with converter networks. The collector-emitter terminals of a power switching transistor are connected in series between a source of power and a converter. A sensing transistor adapted to sense the AC operation of the converter is connected through a current amplifying circuit to the base of the power transistor. In addition, proportional current drive for the power transistor is provided by connecting the current amplifier circuit through a current transformer to sense a signal that is proportional to the current flow in the collector of the power transistor. The drive to the power transistor stops when converter failure occurs because the signal applied to the sensing transistor ends.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

PATENTED MAR 23 1971  3,571,662
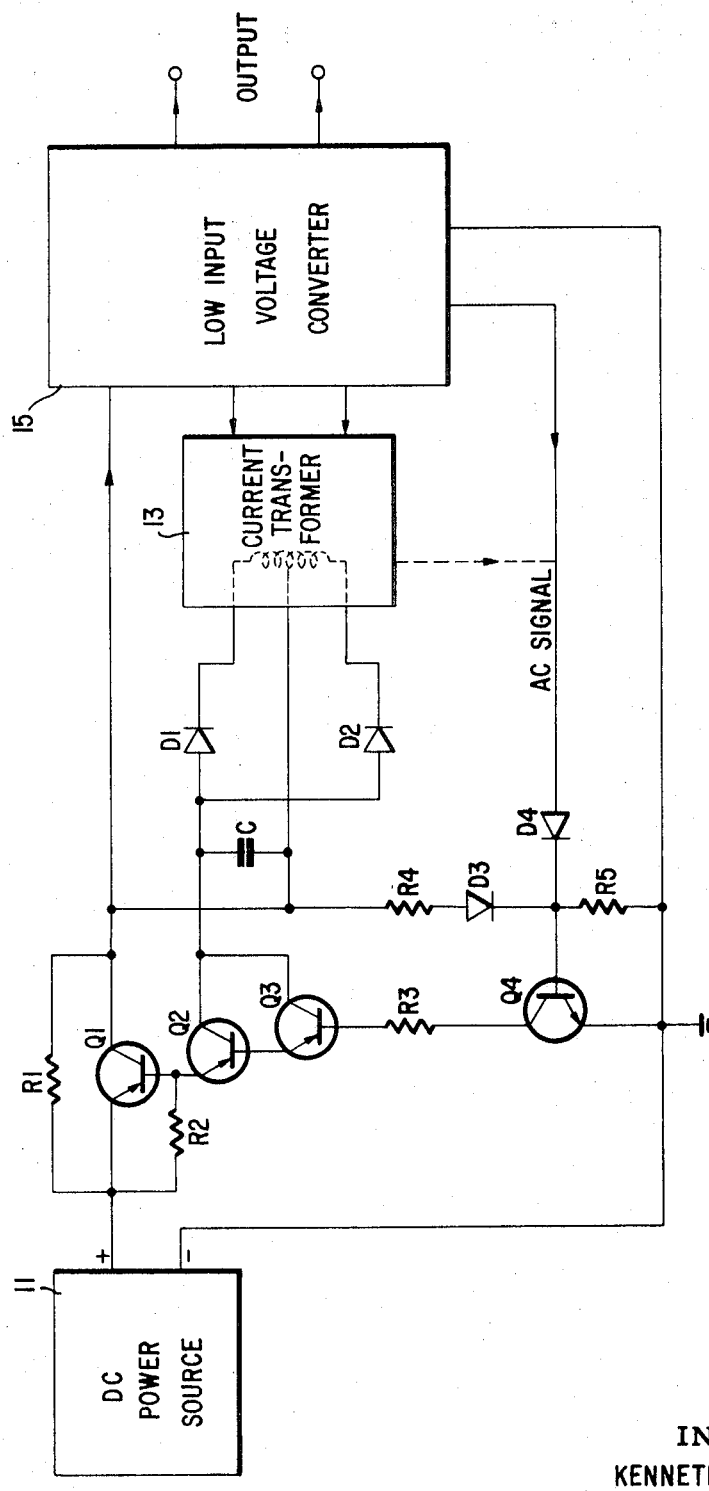
INVENTOR
KENNETH J. JENSON
BY
ATTORNEYS

FAILURE SENSING AND PROTECTION CIRCUIT FOR CONVERTER NETWORKS

BACKGROUND OF THE INVENTION

The use of converter circuits to convert electrical energy from one form to another form or from one level to another level are well known. Generally, a DC source is connected through transistor power switches to a step-up or stepdown transformer, as the case may be. The transistor power switches are alternately switched on and off to cause an AC current flow in the primary winding of the transformer. The secondary winding of the transformer is connected to a rectifying circuit so that a DC output signal of a different level than the DC input signal is provided. In some environments, if an AC signal is desired, the rectifying circuit is eliminated. Various modifications of this general system are well known in the art.

One of the problems with prior art converter circuits is that if one of the switching transistors fails, undesirable high currents occur which may destroy the converter or, in any event, make it unsuitable for further use. One prior art system for protecting converter circuits uses a current sensing relay which is connected to sense the output current of the converter circuit. When a high output current occurs, the relay opens the electrical connection between the power supply and the input to the converter circuit. The problem with using current sensing relay systems is that in some environments their mode of operation is undesirable. For example, relays are undesirable for use onboard a spacecraft due to the possibility of arcing across their contacts. Moreover, in the vacuum of space, relay lubricants out gas. In addition, even if the voltage being used is low enough to make arcing a nonoccurring phenomenon, relay circuits are bulkier and heavier than desirable. Hence, it is desirable to provide a solid state switching network for use in lieu of relay networks to open the primary circuit of a converter when failure occurs. In addition, because some inverters are designed to be utilized with a shorted secondary winding, it is desirable to sense something other than the current through the secondary winding to detect transistor failure. Consequently, it is desirable to provide an apparatus for opening the primary circuit of a converter when transistor failure occurs that is useful with converter circuits operating under conditions wherein the secondary winding of the converter may be short circuited under normal operating conditions.

Therefore, it is the object of this invention to provide a new and improved failure sensing and protection circuit suitable for use with converter networks.

It is a further object of this invention to provide a failure sensing circuit that is adapted to sense the failure of a converter circuit wherein the converter circuit can operate under shorted output conditions without operating the failure sensing and protection circuit of the invention.

It is a still further object of this invention to provide a failure sensing and protection circuit that is formed of solid state components.

In addition, in some environments, converters operate from low voltage sources, hence, the protection circuit must not have a high voltage drop when in operation. Therefore, it is a still further object of this invention to provide a failure sensing and protection circuit that is suitable for use with low voltage converters.

SUMMARY OF THE INVENTION

In accordance with a principle of this invention, a failure sensing and protection circuit suitable for use with converter networks is provided. The collector-emitter terminals of a power switching transistor are connected in series between the converter's source of power and the converter. A sensing transistor adapted to sense the AC operation of the converter is connected through an amplifying circuit to the base of the power transistor. When AC operation fails, the sensed signal ends and the switching transistor is opened.

In accordance with a further principle of this invention, the amplifying circuit is a darlington pair transistor amplifier and is biased by a signal proportional to the collector current of the power or switching transistor.

In accordance with a further principle of this invention, the AC signal driving the sensing transistor is rectified prior to its application to the base of the sensing transistor so that unidirectional signals are applied to the sensing transistor.

It will be appreciated from the foregoing brief summary of the invention that a rather uncomplicated apparatus for sensing failure of a converter and preventing the further application of power to the converter from a power source is provided. Due to the fact that AC operation of a converter is sensed, rather than just a high current condition, a transistor in the converter must fail before failure of the converter is sensed and the power source is disconnected from the converter. Hence, short circuit output currents can occur without interrupting converter operation. In addition, because the circuit is entirely solid state, it is lighter in weight and less bulky than prior art circuits wherein relay switching components are utilized. Moreover, because the collector-emitter terminals of a power transistor are connected in series between the power source and the inverter, only a small voltage drop occurs across the protection circuit of the invention.

BRIEF DESCRIPTION OF THE DRAWING

The foregoing objects and many of the attendant advantages of this invention will become more readily appreciated as the same becomes better understood by reference to the following detailed description when taken in conjunction with the accompanying drawing wherein a preferred embodiment of the invention is illustrated in partially block and partially schematic form.

DESCRIPTION OF THE PREFERRED EMBODIMENT OF THE INVENTION

The FIGURE illustrates in partially schematic and partially block form a preferred embodiment of the invention. The block portion of the FIGURE comprises: a DC power source 11; a current transformer 13; and a low input voltage converter 15. The schematic portion of the FIGURE comprises; three PNP transistors designated Q1, Q2, and Q3; and NPN transistor designated Q4; four diodes designated D1, D2, D3, and D4; a capacitor designated C; and, five resistors designated R1, R2, R3, R4, and R5.

The positive output terminal of the DC power source 11 is connected to the emitter of Q1, to one end of R1 and to one end of R2. The other end of R1 is connected to the collector of Q1. The collector of Q1 is also connected to one input of the low input voltage converter 15. The other end of R2 is connected to the base of Q1.

The base of Q1 is connected to the emitter of Q2 and the base of Q2 is connected to the emitter of Q3. The collector of Q3 is connected to the collector of Q2 and the base of Q3 is connected through R3 to the collector of Q4. The emitter of Q4 is connected to the negative side of the DC power source 11 which is also ground.

The base of Q4 is connected to the cathode of D3. The anode of D3 is connected through R4 to the collector of Q1. The base of Q4 is also connected to the cathode of D4 and through R5 to ground. The anode of D4 is connected to an AC signal output of the low input voltage converter 15. The AC signal output could be an AC sense winding on the converter's transformer, for example. Or, the anode of D4 could be connected to the current transformer 13 to sense the AC signal as illustrated by the dashed line. The emitter of Q4 is connected to ground or the second input of the low voltage input converter 15.

The capacitor C is connected between the collector of Q1 and the collectors of Q2 and Q3. The collectors of Q2 and Q3 are also connected to the anodes of D1 and D2. The cathode of D1 is connected to one side of a secondary winding of the current transformer 13 illustrated by the dashed lines. The cathode of D2 is connected to the other side of the secondary winding of the current transformer 13. The center tap of the secondary winding of the current transformer 13 is connected to the collector of Q1. D1 and D2 rectify the AC signal sensed by the current transformer and C filters the rectified signal.

The schematically illustrated part of the invention provides the switching operation that effectively connects the DC power source 11 to the low input voltage converter 15 with a low voltage drop or isolates the DC power source from the low input voltage converter 15. Q1 performs the power switching function and is driven proportionally to its own collector current. Proportional drive is effected because the primary winding of the current transformer 13 is connected in the secondary circuit of the low input voltage converter 15. The primary winding (and thus the secondary winding) of the current transformer is directly proportional to the Q1 collector current because the Q1 collector current is directly proportional the current flow in the secondary winding of the low input voltage converter 15. And, because the secondary winding of the current transformer 13 is connected to the collectors of Q2 and Q3, these transistors drive Q1 in a manner that is also proportional. It should be noted that Q2 and Q3 as illustrated in the FIGURE form the well known darlington pair amplifier circuit. The drive path for Q2 and Q3 is completed through Q4. Hence, when Q4 is turned on, Q1 is turned on. Q2 and Q3 formed a proportional amplifier circuit for the Q4 signal. Q4 (and thus Q1) is turned on by current flow through either D3 or D4. Normally, current flow through D3 initially turns Q4 on and current flow through D4 sustains Q4 in an on state.

D4 provides a path and carries sustaining turn-on power even when the output of the low input voltage converter is shorted. It will be appreciated that in some environments the output of a voltage converter may be shorted during normal operation. For example, the output of a low input voltage converter is often shorted when the converter is operating from a thermoelectric source so as to provide cooling for the source. In any event, D4 provides sustaining turn-on power even when the output of the low input voltage converter is shorted. However, when one of the switching power transistors in the low input voltage converter becomes shorted, no AC signal occurs. Because no AC signal occurs, no power is applied through D4 to Q4. In addition, no power flows through D3 because a shunt path around D4 through the low input voltage converter was created when the transistor became shorted. Hence, neither D3 nor D4 apply a signal to the base of Q4 and Q4 is biased off. Because Q4 is biased off, Q1 is biased off and the DC power source 11 becomes isolated from low input voltage converter. In this manner, the invention senses inverter failure and protects the power source.

It will be appreciated from the foregoing description that the invention provides a solid state apparatus suitable for protecting voltage converter circuits from shorts in their switching components. While the invention is primarily useful in combination with a low input voltage converter, because a very small power drop occurs across the protection circuit, it is also useful with higher voltage converter circuits. Because the invention senses switch failure as opposed to a shorted output, the converter can operate under a shorted output condition without the converter being disconnected from the power source. However, when switch failure does occur, the DC power supply is disconnected from the converter.

I claim:

1. A failure sensing and protection circuit for converter networks for connection between a DC power supply and a voltage converter comprising:

a first transistor having its collector-emitter terminals adapted for connection between one output terminal of said DC power source and one input terminal of said voltage converter;

a second transistor having its base connected so as to sense the AC operation of said voltage converter;

amplifier means connected to the collector-emitter terminals of said second transistor and to the base of said first transistor to amplify the signal sensed by said second transistor prior to its being applied to said first transistor;

current transformer means connected to said voltage converter for sensing the output current of said first transistor; and, rectifier means connected to the output of said current transformer means for rectifying the output of said current transformer means and applying it to said amplifier means.

2. A failure sensing and protection circuit for converter networks as claimed in claim 1 wherein said amplifier means comprises third and fourth transistors connected in a darlington pair configuration with the base of one transistor connected through a resistor to the collector of said second transistor and the emitter of said fourth transistor being connected to the base of said first transistor.

3. A failure sensing and protection circuit for converter networks as claimed in claim 2 including a first resistor connected in parallel with the collector-emitter terminals of said first transistor.

4. A failure sensing and protection circuit for converter networks as claimed in claim 3 including a second resistor and a first diode connected in series between the collector of said first transistor and the base of said second transistor and including a third resistor connected across the base-emitter terminals of said second transistor.

5. A failure sensing and protection circuit for converter networks as claimed in claim 4 including a second diode connected between the base of said second transistor and said voltage converter to sense the AC operation of said voltage converter.

6. A failure sensing and protection circuit for converter networks as claimed in claim 5 wherein said rectifying means comprises:

a third diode connected at one end to one side of the secondary winding of said current transformer means;

a second diode connected at one end to the other side of the secondary winding of said current transformer means;

the other ends of said diodes connected together and to the collectors of said third and fourth transistors; and a capacitor connected between the other ends of said diodes and the collector of said first transistor.

7. In combination with a DC power supply and a DC to AC power converter, a power transistor having a collector emitter path in series between an output terminal of the supply and an input terminal of the converter, means responsive to operation of the converter for deriving a first signal having a first value for back biasing the transistor to a cutoff state in response to a failure of AC power being derived by the converter, and having a second value for forward biasing the transistor to a conducting state in response to AC power being derived by the converter, means sensing the level of DC current supplied by the transistor to the converter for deriving a second signal proportional to the current level, and means responsive to the first and second signals for controlling the magnitude of the current in response to the amplitude of the second signal while the first signal has the second value and for back biasing the transistor while the first signal has the first value regardless of the amplitude of the second signal.